Oct. 26, 1954 A. BIGIO 2,692,658
GROUND ENGAGING VEHICLE BRAKING DEVICE
Filed Aug. 10, 1953 2 Sheets-Sheet 1
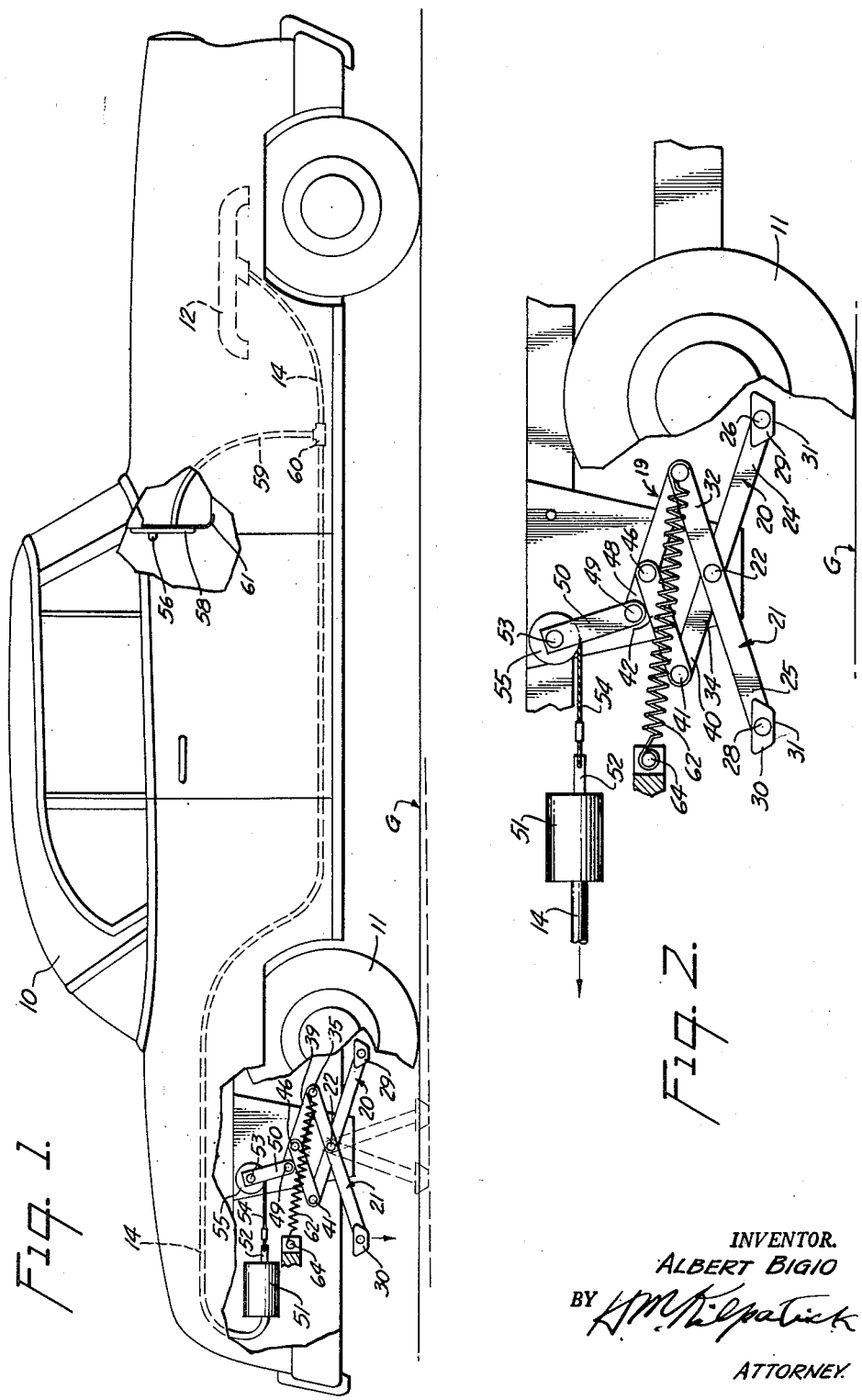
INVENTOR.
ALBERT BIGIO
BY
ATTORNEY.

Oct. 26, 1954  A. BIGIO  2,692,658
GROUND ENGAGING VEHICLE BRAKING DEVICE
Filed Aug. 10, 1953  2 Sheets-Sheet 2
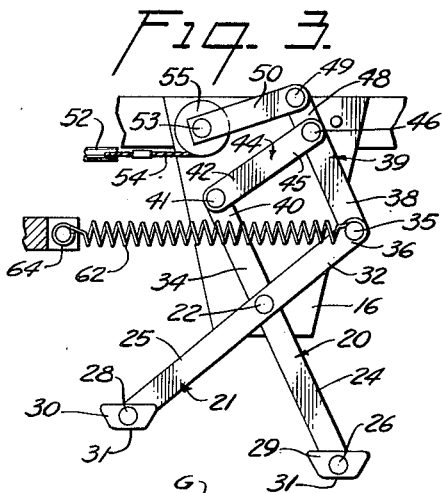
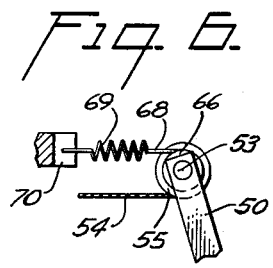
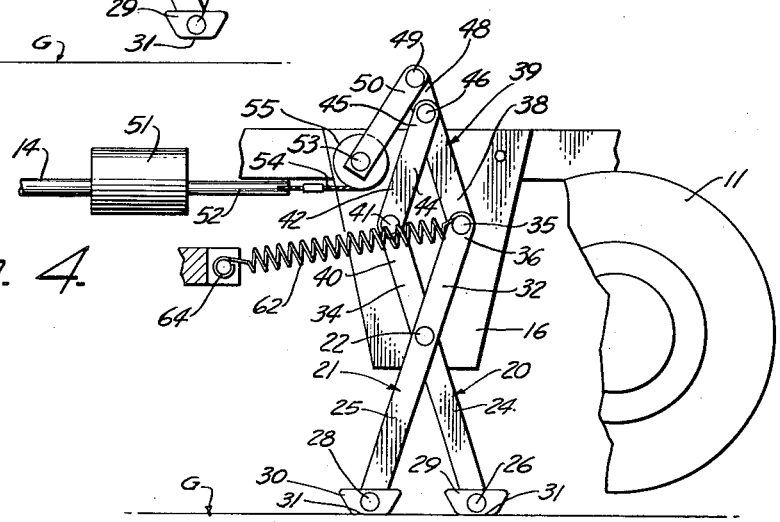
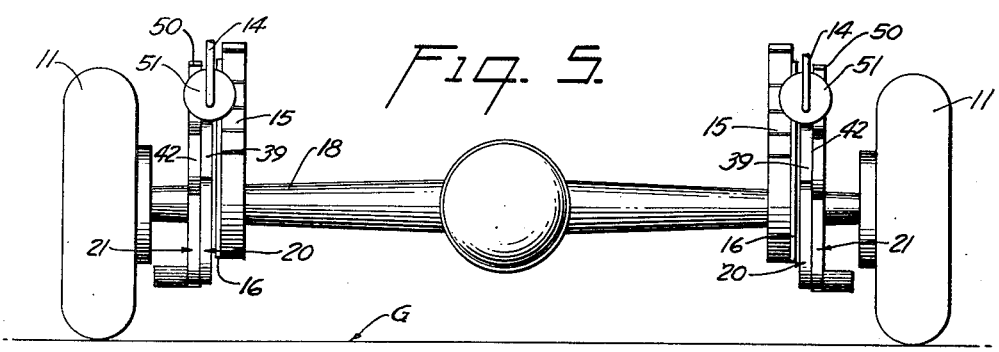
INVENTOR.
ALBERT BIGIO
ATTORNEY.

Patented Oct. 26, 1954

2,692,658

UNITED STATES PATENT OFFICE 2,692,658

GROUND ENGAGING VEHICLE BRAKING DEVICE

Albert Bigio, Brooklyn, N. Y.

Application August 10, 1953, Serial No. 373,419

2 Claims. (Cl. 188—5)

This invention relates to means for stopping motor vehicles such as automobiles and more particularly to braking means in the form of jacks which may be quickly lowered adjacent rear wheels of the vehicle by the mere pushing of a button located conveniently to an occupant of the vehicle.

One object of the invention is to provide a stopping device which will operate almost instantaneously.

Another object is to provide a device which will lift the drive wheels from the ground so that no driving force can be applied to the car.

Still another object is to provide a braking system that will function independently of the conventional braking systems.

In the accompanying drawing showing, by way of example, one of many possible embodiments of the invention, Fig. 1 is a side elevation showing the device in connection with an automobile;

Figs. 2, 3 and 4 are operational views of the device;

Fig. 5 is a partial rear elevation showing the device in connection with an automobile and, Fig. 6 is a detail of a part of the device.

The invention is shown in connection with a vehicle 10, such as an automobile having rear drive wheels 11 normally engaging the ground G in running condition. The automobile is provided with the usual motor (not shown) having an intake manifold 12 to which is connected a vacuum line 14 such as is conventionally used for the operation of windshield wipers, conventional truck brakes and the like.

Near the wheels 11 and on the frame 15 of the vehicle, are mounted fast a pair of mounting members 16 extending about as low as the rear axle 18 (Fig. 5) for carrying a braking device, generally designated 19, adapted to engage the ground.

The braking device 19 comprises a pair of crossed bar members 20 and 21, each pivoted on a pivot bolt 22 secured fast to the mounting member 16 and operating somewhat in the manner of scissors. The bar members at the lower portions provide a leading leg 24 and a trailing leg 25 pending from the pivot bolt 22. The lower extremities of the legs have pivoted thereon, as at 26 and 28, shoes 29 and 30 each having friction material 31 on their bottoms to engage the ground. The trailing leg 25 is preferably slightly longer than the leading leg 24.

The upper portions of the bar members 20 and 21 provide leading and trailing arms 32 and 34 of substantially the same length. The leading arm 32 is pivoted at its upper end 36 as at 35 to the lower end 38 of a work link 39 which is longer than arm 34. The trailing arm 34 is connected at its upper end 40, at pivot 41, to the lower end 42 of a connecting link 44 of the same length as the lead arm 32. The upper end 45 of the connecting link 44 is pivoted as at 46 to a point on the work link 39 to form a parallelogram, leaving an extension 48 of the work link projecting generally upwardly.

To limit the motion of the links and legs to the desired constraint, the extension 48 is in turn connected by a pivot member 49 to the end of a crank 50 mounted for oscillation on the mount 16 by means of a shaft 53. The legs are held in retracted position by a vacuum cylinder 51 mounted fast with respect to the frame and acting on the crank 50 to hold it in downward position as in Fig. 2. The cylinder, under vacuum from the line 14, acting through piston 52 and cable 54 wound on a windlass or drum wheel 55 fast with respect to crank 50, holds the braking device in retracted position. The shaft 53 is above and rear of the bolt 22 and, as the crank turns, the pivot 49 is always forward of the shaft and the pivot 49 moves in an arc from below to above the shaft.

The vacuum in the line 14 may be broken by pushing a button 56 to open a normally closed valve 58 on a bleeder branch 59 tapping the vacuum line 14 at 60. The valve and button are mounted in a convenient position to an occupant of the car, for example on the instrument panel 61 of the vehicle.

In the absence of reduced pressure in the cylinder 51, the legs 24 and 25 are urged to become lowered, so that the shoes 26 and 28 engage the ground G, by a tension spring 62 tensed between the pivot pin 35 and a fixed part 64 of the frame 15 an appreciable distance to the rear of the pivot 46, so that contraction of the long spring will not unduly diminish the force of the spring.

It will be noticed that as legs of the braking device engage the ground the spring 62 is acting nearly perpendicular to the arm 32 for maximum effectiveness.

In operation, when the button 56 is pushed to break the vacuum, the contraction of the spring 62 lowers the trailing leg 25 as the member 21 pivots about point 22. However, the position of shaft 53 and the lengths of the crank arms and links are so related that the crank pushes these parts forward about point 22 as in Fig. 3, causing the lead leg 24 initially to drop lower than the trailing leg. Then as the crank 50 rises about the horizontal (Fig. 4) the trailing leg 25 moves faster toward the ground than does the lead leg. This action prevents the lead leg shoe 29 from digging into the ground, for engagement by the trailing shoe 30 tends to lift the lead shoe by a tendency to reverse the motion previously obtained. It is preferable that the legs be long enough to lift the wheels 11 completely from the ground.

While the above description sets forth the fundamentals of construction and operation, it may be that the spring 62 alone will not be sufficient to cause lowering of the legs (since its initial line of action is above point 41) unless the legs and shoes are sufficiently heavy. It is preferable to have some sort of means to urge initial movement of the device, and this I may provide, in the form of an additional windlass wheel 66 on the shaft 53 carrying a cable 68 attached to a tensed tension spring 69 anchored at 70 tending to rotate the crank 50 in the opposite direction from that obtained by the cylinder 51 under vacuum, as shown in Fig. 6.

The invention claimed is:

1. In a braking device, a pair of bar members crossed at a fixed pivotal axis to provide leading and trailing arms and legs, the legs being operable to retracted position and at least partially closable to operative position for engaging a surface; a work link and a connecting link pivoted together and having ends pivoted to the ends of said arms, the links and arms forming a parallelogram, the work link being pivoted to the leading arm and provided with an extension projecting away from said surface; a crank having an arm mounted for rotation about an axis parallel to and rear of the pivotal axis and more remote from the surface than is the pivotal axis; the end of the crank arm being pivoted to the extension at a point to the rear of a straight line between the two axes when the legs are in extreme retracted position.

2. In a device as in claim 1 said point being more remote from said surface than is the crank axis when the legs engage the surface.

References Cited in the file of this patent

UNITED STATES PATENTS

| Number | Name | Date |
|---|---|---|
| 1,006,659 | Hormel | Oct. 24, 1911 |
| 2,017,749 | Brainard | Oct. 15, 1935 |
| 2,437,108 | Madison | Mar. 2, 1948 |

FOREIGN PATENTS

| Number | Country | Date |
|---|---|---|
| 288,854 | Great Britain | Apr. 19, 1928 |